United States Patent [19]
Maddy

[11] Patent Number: 5,608,762
[45] Date of Patent: Mar. 4, 1997

[54] APPARATUS AND METHOD FOR AUTOMATIC DISCRIMINATOR COMPENSATION IN A FSK RECEIVER

[75] Inventor: Steven L. Maddy, Boulder, Colo.

[73] Assignee: Spectralink Corporation, Boulder, Colo.

[21] Appl. No.: 85,883

[22] Filed: Jun. 30, 1993

[51] Int. Cl.$^6$ .................................................. H04L 25/06
[52] U.S. Cl. .......................... 375/319; 375/334; 329/319; 329/320
[58] Field of Search ..................... 375/272, 285, 375/287, 317, 319, 334, 344, 346; 329/318–320, 349, 351, 353; 455/295–296, 309–310, 343

[56] References Cited

U.S. PATENT DOCUMENTS

| | | | |
|---|---|---|---|
| 4,575,863 | 3/1986 | Butcher | 375/365 |
| 4,631,737 | 12/1986 | Davis | 375/334 |
| 4,821,292 | 4/1989 | Childress | 375/319 |
| 4,939,851 | 5/1990 | Pace | 327/73 |
| 5,001,726 | 3/1991 | Kawai | 375/317 |
| 5,027,352 | 6/1991 | Goode | 370/110.1 |
| 5,052,021 | 9/1991 | Goto | 375/317 |
| 5,175,749 | 12/1992 | Ficht | 375/319 |

*Primary Examiner*—Young T. Tse
*Attorney, Agent, or Firm*—Dorr, Carson, Sloan & Birney, P.C.

[57] ABSTRACT

A portion of a FSK signal is encoded with a central frequency ($f_0$) and the FSK signal is transmitted. A receiver captures the transmitted FSK signal, and demodulates the FSK signal to provide and analog data signal. The analog data signal is DC coupled to a first input of a comparator. The comparator generates a logic level binary output corresponding to the FSK signal. A second input of the comparator is coupled to a bias circuit. Preferably the bias circuit is provided by a digital to analog convertor (DAC). A control circuit detects the predetermined portion of the FSK signal in which the center of frequency is being transmitted. During the predetermined portion the control circuit samples the binary logic level output of the comparator, converts the binary logic level output to a digital error word, and uses the digital error word to control the DAC.

9 Claims, 4 Drawing Sheets

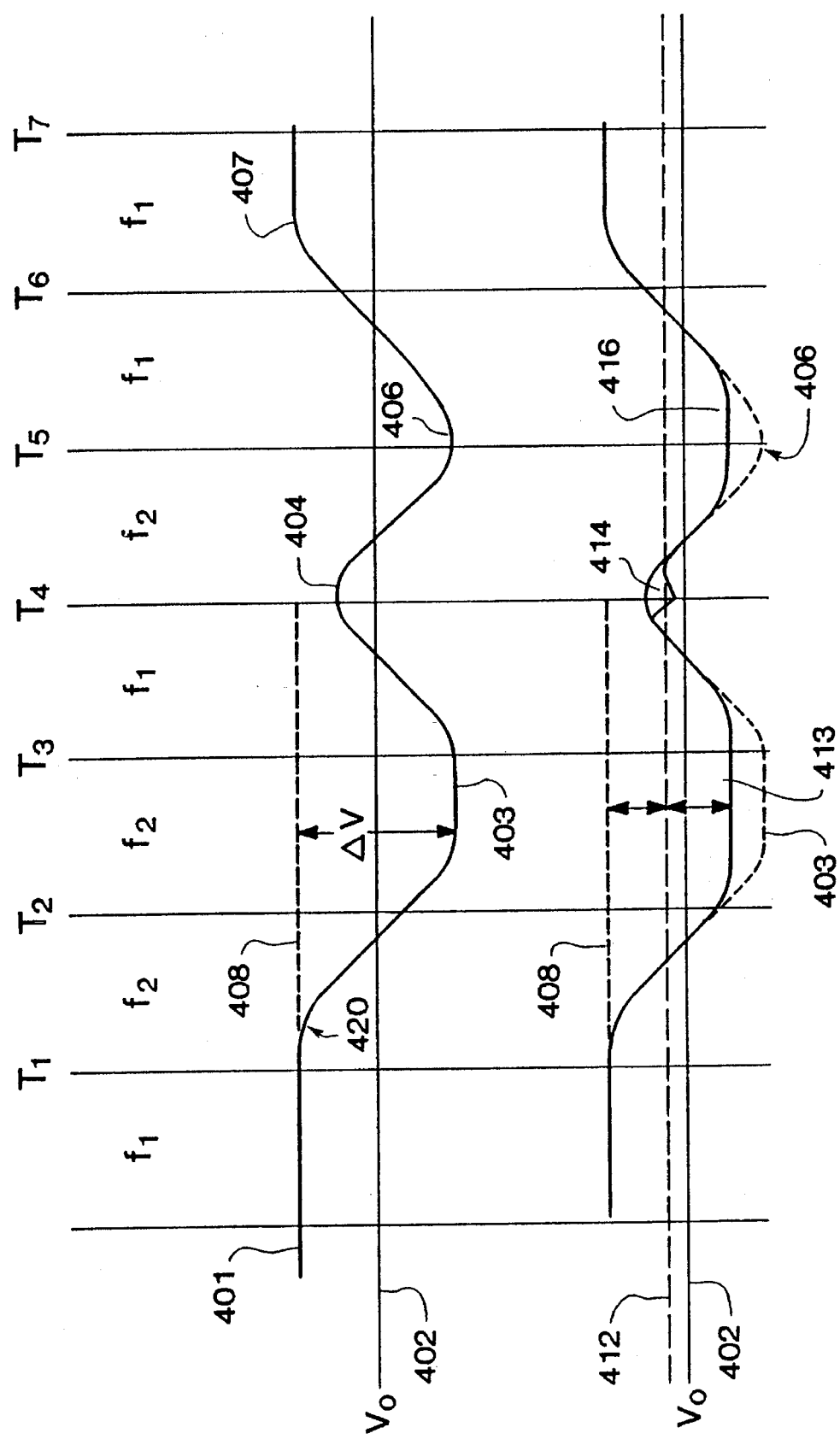

000
APPARATUS AND METHOD FOR AUTOMATIC DISCRIMINATOR COMPENSATION IN A FSK RECEIVER

BACKGROUND OF THE ART

1. Field of the Invention

The present invention relates to receivers for detecting transmitted binary frequency shift key (FSK) data and, more particularly, to a system for automatically eliminating DC offset in the FSK receiver.

2. Statement of the Problem

Digital radio transceivers are used in a variety of communications products. In particular, pagers, portable data terminals, and digital cellular telephones use digital radio transceivers. In all digital transceivers, the data that is to be transmitted must be encoded onto a radio frequency (RF) carrier for transmission. Also, a receiver must be able to demodulate a received signal. Further the receiver must process the demodulated signal to reproduce the digital data, usually binary logic level data, that was originally transmitted.

One commonly used technique in digital radio communication is called frequency shift keying (FSK). FSK technology involves using a first frequency ($f_1$) to represent a first binary logic state, and a second frequency ($f_2$) to represent the second binary logic state. The frequencies $f_1$ and $f_2$ are separated in the frequency spectrum sufficiently to allow accurate detection by the receiver. A frequency $f_0$ between $f_1$ and $f_2$ is called the center frequency.

In digital radio receivers of this type, the receiver includes circuitry for demodulating the FSK signal. The demodulating circuit, called a discriminator, provides an analog output representing the FSK signal. An offset voltage is superimposed on or added to the demodulated analog signal. Ideally, this offset voltage has a fixed value and is known. If such an ideal signal existed, conversion of the demodulated analog signal to a binary logic level signal would be a simple matter of comparing the demodulated signal to the known offset voltage using a digital comparator.

In reality, however, the demodulated analog signal is offset by a variable amount caused by frequency mismatch between the transmitter and the receiver, as well as irregularities caused by temperature changes and variabilities in device performance. Hence, the offset voltage is not a fixed voltage, but instead continuously varies during operation.

Once the FSK signal is demodulated from the carrier by the receiver, the demodulated signal is compared to a threshold voltage or bias voltage. The bias voltage should be as close as possible to the offset voltage superimposed on the demodulated analog signal. Quite simply, if the demodulated signal is greater than the threshold voltage, the circuit interprets it as a logic HIGH, and if the demodulated signal is below the threshold voltage the circuit interprets it as a logic LOW. A difference between the offset voltage and the bias voltage causes some portions of the demodulated FSK signal to be too close to the bias voltage while causing other portions to be too far from the bias voltage to allow accurate conversion to a binary logic level signal. It is important that the receiver has some way of changing the threshold or bias voltage automatically to compensate for changes in the offset voltage and ensure accurate data decoding in adverse environments.

Several prior art offset compensation circuits are known. One technique attempts to correct offset voltage disturbances by adjusting the receiver local oscillator frequency until the received frequency and the local oscillator are in lock. The resulting circuitry for this technique is quite complex and may be undesirable in a portable unit with limited space and power source capabilities. Also, this method can only compensate for offset voltage variations caused by frequency mismatch, and cannot compensate for variations caused by the receiver components themselves.

U.S. Pat. No. 4,575,863 issued to Butcher et al. on Mar. 11, 1986 describes a method which activates a bias circuit in the receiver during a portion of the received data that is regular and predictable (i.e. a long series of "1010" data). During the selected time period, a capacitor is allowed to charge to an average level of the demodulated data signal. Later, when the incoming data is not predictable or regular, as would be the case in normal data transmission, the capacitor voltage is used as a bias voltage. This method works well when the incoming signal is truly uniform and regular during the selected time period. However, distortions in the incoming signal, or distortions created by the receiver circuit itself, will lead to an erroneous determination of the correct offset voltage.

U.S. Pat. No. 4,929,851 issued to G. Pace on May 29, 1990 describes a method using a feedback system which adjusts the threshold for the voltage comparison by continuously integrating the demodulated signal and using the integrated signal as a threshold voltage. Again, this method works well when the FSK data is a uniform pattern of logic 1's and logic 0's so long as there is no miscellaneous distortion in the receiver or transmitter that would cause the center of the data to not be halfway between the minimum and maximum data states. Also, because this method determines the offset voltage by sampling the demodulated signal, it cannot account for any distortion or offset caused by the comparator.

Another type of offset correction circuit is shown in U.S. Pat. No. 5,052,021 issued to Goto et al. on Sep. 24, 1991 and in U.S. Pat. No. 5,027,352 issued to Goode on Jun. 25, 1991. In this technique the demodulated data signal is analyzed to find peak voltage and valley voltage levels. The peak and valley voltages are averaged together to find a center voltage which is used as the bias voltage. Once again, this method is sensitive to any type of distortion that would make the true logic center be different from the mathematical center of the peak and valley voltages. Also, this technique requires circuitry to sample and hold peak values, including circuitry to differentiate the demodulated data signal. The circuitry adds expense and complicates receiver design.

U.S. Pat. No. 5,175,749 issued to Ficht et al. on Dec. 29, 1992, involves injecting a locally generated signal at the center frequency into the radio receiver during idle periods. The analog output is then sampled during the idle period and stored and used during the active period as the bias voltage. This method offers the advantage of sampling the actual output so that offset or distortion caused by any of the components in the receiver circuit is accounted for. However, because the center frequency is locally created and injected into the receiver, distortion caused by front end components of the receiver or between frequency mismatch between the transmitter oscillator and the receiver oscillator is not accounted for.

A need exists, especially in communication environments, for a method and apparatus for automatically determining an offset voltage in an FSK receiver with a high degree of accuracy. Also, an apparatus and method are needed for determining offset voltage and correcting for that offset voltage with a minimum of circuitry. Further, a method for offset determination and compensation is needed which accounts for all sources of offset voltage variation and distortion in the receiver and transmitter circuits.

3. Solution to the Problem

The present invention provides a solution to the above problem by a system using a transmitter to broadcast an FSK signal, where the transmitter also periodically transmits a central frequency ($f_0$) during a predetermined portion of the FSK signal. A receiver captures the transmitted FSK signal, and demodulates the FSK signal to provide an analog signal. The analog signal is DC coupled to one input of a comparator. The comparator generates a logic level binary output corresponding to the FSK signal. The other input of the comparator is coupled to a bias voltage. Preferably the bias voltage is provided by a digital to analog convertor (DAC).

A control circuit detects the predetermined portion of the FSK signal in which the center frequency is being transmitted. During the predetermined portion the control circuit samples the binary logic level output of the comparator, converts the binary logic level output to a digital error word, and uses the digital error word to control the DAC. Hence, the bias voltage is determined from the last stage comparator output and thus accounts for all sources of offset error in a circuit. This solves the above problem by determining an offset voltage in an FSK receiver with a high degree of accuracy. Also, by implementing the control circuitry in an on-board microprocessor, very little dedicated circuitry is needed to implement the method of the present invention.

SUMMARY OF THE INVENTION

Briefly stated, the present invention provides a system using a transmitter to broadcast an FSK signal, where the broadcast FSK signal includes a center frequency ($f_0$) during a predetermined portion of the FSK signal. A receiver captures the transmitted FSK signal and demodulates the FSK signal to provide an analog data signal. The analog data signal is DC coupled to an input of a comparator. The comparator generates a logic level binary output corresponding to the FSK signal. Another input of the comparator is coupled to a bias circuit. Preferably the bias circuit is provided by a digital to analog convertor (DAC).

A control circuit monitors the comparator output and detects the predetermined portion of the FSK signal in which the center frequency is embedded. During the predetermined portion the control circuit monitors the binary logic level output of the comparator and converts the binary logic level output to a digital error word. The digital error word controls the analog output of the DAC which is then supplied to the input of the comparator.

DESCRIPTION OF THE DRAWING

FIG. 4 is a timing diagram illustrating internal signals generated by the offset compensation circuit in accordance with the present invention;

DETAILED SPECIFICATION

1. Overview

Figure 1:
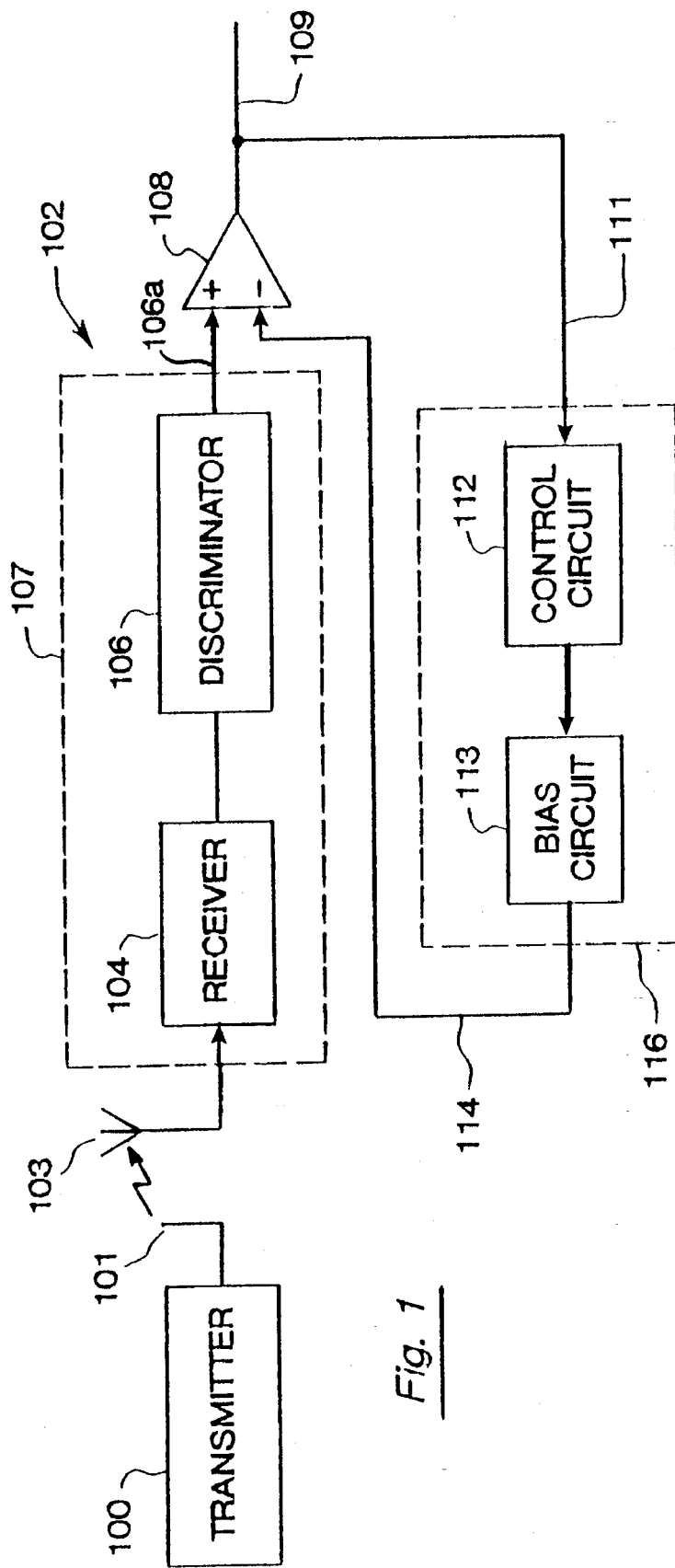
FIG. 1 illustrates a block diagram of a system for automatically compensating for offset voltage changes in an FSK receiver in accordance with the present invention.

In systems for digital transmission of information, frequency modulation (FM) is a well known and efficient method for transmitting the digital information over a radio frequency (RF) carrier. One way of transmitting digital information using frequency modulation is frequency shift keying (FSK). In FIG. 1, transmitter 100 broadcasts an FSK signal from antenna 101. A typical binary FSK signal uses a first frequency ($f_1$) to represent a first logic state and a second frequency ($f_2$) to represent a second logic state. The first and second frequencies are symmetrically placed about a center frequency ($f_0$). Conventional FSK transmitters need only be capable of broadcasting $f_1$ and $f_2$ to transmit binary digital information. In accordance with the present invention, however, transmitter 100 is capable of periodically transmitting the center frequency $f_0$ as imbedded signal information in the FSK signal.

Receiving equipment 102, such as a telephone, pager, radio, or television includes circuitry 107 for receiving and demodulating the RF signal. Once the RF signal is demodulated it is converted into a logic level signal so that it can be used in subsequent digital circuitry. Receiver 104 represents well-known front-end circuitry which is preferably coupled to antenna 103 for receiving the RF signal. Alternatively, receiver 104 can be coupled to a transmission line (not shown) or the like. Receiver 104 outputs an intermediate frequency (IF) signal. The IF signal is still frequency modulated with the FSK signal transmitted by transmitter 100.

Discriminator 106 receives the IF signal and produces an analog output on line 106a which is the demodulated FSK signal. For example, discriminator 106 will output a continuously variable voltage that approaches a "peak" voltage level when receiver 104 detects the first frequency $f_1$. Likewise, the output of discriminator 106 will approach a "valley" voltage level when receiver 104 detects the second frequency $f_2$. Circuitry for both receiver 104 and discriminator 106 are well known in the industry. Integrated circuits having both receiver 104 and discriminator 106 integrated in a single device are available from Signetics Corporation under part number NE605.

The analog output on line 106a ideally would have nearly instantaneous voltage transitions. Also, the output on line 106a would ideally have a discrete peak voltage representing a logic HIGH ($V_{HIGH}$) and a discrete valley voltage representing a logic LOW ($V_{LOW}$). If this ideal signal were present, conversion of the analog output signal on line 106a of discriminator 106 to a logic level binary signal would be a simple matter of comparing the output of discriminator 106 to a fixed reference voltage using a digital comparator.

However, discriminator 106 and receiver 104 preferably heavily filter the analog output on line 106a resulting in gradual rather than instantaneous voltage transitions. The heavy filtering also results in the peak and valley voltages each being a range of voltages depending upon the length of time that receiving equipment 102 is processing a given logic level signal. Also, an offset voltage ($V_0$) is superimposed on or added to the output signal from discriminator 106. This offset voltage is a somewhat variable amount caused by frequency mismatch between transmitter 100 and receiver-demodulator circuit 107 as well as offset irregularities caused by temperature and variabilities in device performance. Hence, the offset voltage is not a fixed voltage, but instead continuously varies during operation. The offset voltage $V_0$ has a value somewhere between the peak voltage level and the valley voltage level of the output from discriminator 106. The offset voltage is substantially equal to the discriminator output when the FM signal from transmitter 100 is not modulated by any digital information.

The output 106a is coupled to either the inverting or the non-inverting input of comparator 108 which is used to convert the analog demodulated FSK signal from discriminator 106 into a binary logic level signal on output 109. Comparator 108 is a conventional logic comparator having the desired logic level outputs to match with subsequent signal processing circuitry. Preferably the output of discriminator 106 is DC coupled to an input of comparator 108 to allow low frequency signals generated by non-return-to-zero (NRZ) codes used in digital transmission to pass to comparator 108. In order to convert the analog output of discriminator 106 to a logic level binary signal, comparator 108 compares the signal on discriminator 106 to a bias voltage provided on line 114 by offset compensation circuitry 116.

Offset compensation circuitry 116 samples or monitors the binary logic level output from output 109 on line 111. In accordance with the present invention, offset compensation circuitry 116 samples the actual output of comparator 108 so that any offset voltage changes also caused by comparator 108 are compensated by offset compensation circuitry 116. Prior methods sample or monitor the output of discriminator 106, which results in any error caused by comparator 108 being neglected. This is an important feature of the present invention.

Within offset compensation circuit 116, control circuit 112 converts the logic level binary signal to a digital error word in the preferred embodiment, and supplies the digital error word to bias circuit 113. Bias circuit 113 then generates a bias voltage ($V_b$) on line 114 that is substantially equivalent to the offset voltage $V_0$ that is superimposed on the output 106a of discriminator 106. Line 114 couples $V_b$ to the whichever of the inverting or non-inverting inputs of comparator 108 that are not used by line 106a. Application of the correct bias voltage $V_b$ causes the comparator 108 to output $V_{HIGH}$ whenever the signal on line 106a is greater than $V_0$ or $V_b$. Likewise, the comparator 108 outputs $V_{LOW}$ whenever the signal on line 106a is less than $V_0$ or $V_b$.

In accordance with the method of the present invention, transmitter 100 periodically broadcasts the center frequency ($f_0$) during normal transmission of data. Receiver-demodulator circuit 107 processes the center frequency so that discriminator 106 produces an output on line 106a that is substantially equal to the offset voltage $V_0$. When the $f_0$ is being processed, comparator 108 produces a logic HIGH if the output of discriminator 106 is larger than the bias voltage on line 114. Similarly, comparator 108 produces a logic LOW if the output of discriminator 106 is lower than the bias voltage on line 114.

Control circuit 112 monitors the output of comparator 108 and determines when the center frequency is being processed. Because the center frequency is periodically transmitted by transmitter 100, this is preferably done by measuring time or counting clock pulses in control circuit 112 and producing an enable signal when the center frequency is expected to occur. In the preferred embodiment, the enable signal causes bias circuit 113 to increase or decrease by a fixed incremental voltage each time the enable signal occurs. In this manner the bias voltage on line 114 is continuously updated each time $f_0$ is periodically transmitted so that the value of the voltage $V_b$ on line 114 is substantially equal to the output 106a of discriminator 106 when the FM signal from transmitter 100 is not modulated by any digital information.

The apparatus and method of the present invention are described in terms of an FSK transmitter and receiver, however, it should be understood that the apparatus and method are useful in many frequency modulated transmission systems. Likewise, although the preferred embodiment is described as having a binary logic level output, multi-level digital outputs may also be used. Accordingly, these and similar modifications are within the spirit and scope of the present invention.

2. Digital Signal Formatting

Figure 2:
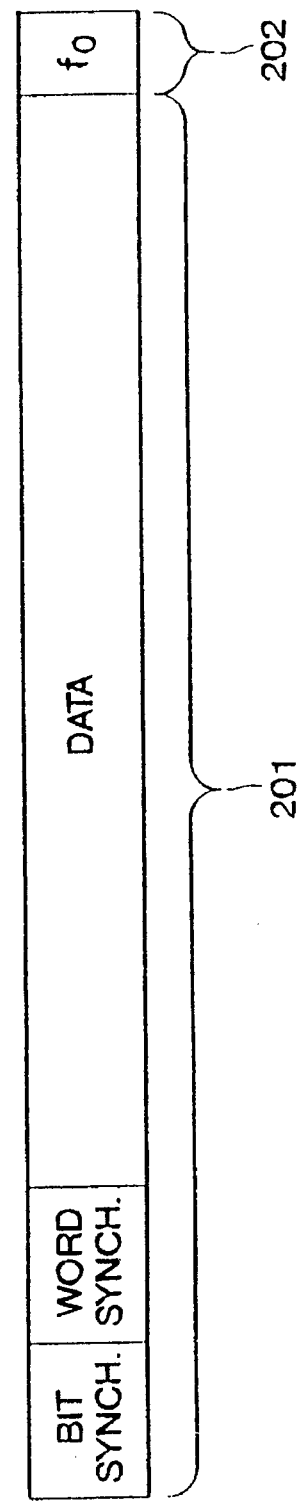
FIG. 2 illustrates a segment of a formatted digital signal in accordance with the present invention.

FIG. 2 illustrates a typical format used to transmit digital data between the transmitter 100 and receiver 107. Digital transmission systems typically use a "packetized" data format which means that information is transmitted in segments or packets of time called "frames" and "slots". In a packetized digital transmission system each time slot shown in FIG. 2 is proceeded by a number of bits used for bit synchronization as well as a number of bits used for word synchronization. Bit synchronization and word synchronization synchronize the receiver's internal clock with the transmitter's internal clock so that the digitally encoded data can be properly decoded. All of the formatting shown in first time period 201 in FIG. 2, including bit synchronization, word synchronization, and data transmissions is well known. A number of other well known data formatting techniques may be used.

In accordance with the present invention, each time slot includes an offset compensation portion 202 in which the center frequency $f_0$ is broadcast by transmitter 100 (FIG. 1). In a particular example the entire length of the time slot shown in FIG. 2, including portion 201 and portion 202, is 1.25 milliseconds in duration. The length of portion 202 is 10 microseconds. It should be understood that the length of offset compensation period 202 is determined by the receiver's ability to detect the center frequency $f_0$ and can be shorter or longer than used in the above example. In the above example offset compensation portion 202 of each time slot cannot be used to transmit data. Although some data transmission capability is sacrificed, in the above example the duration of offset compensation period 202 is only a small fraction (0.8%) of the entire time slot.

Figure 3:
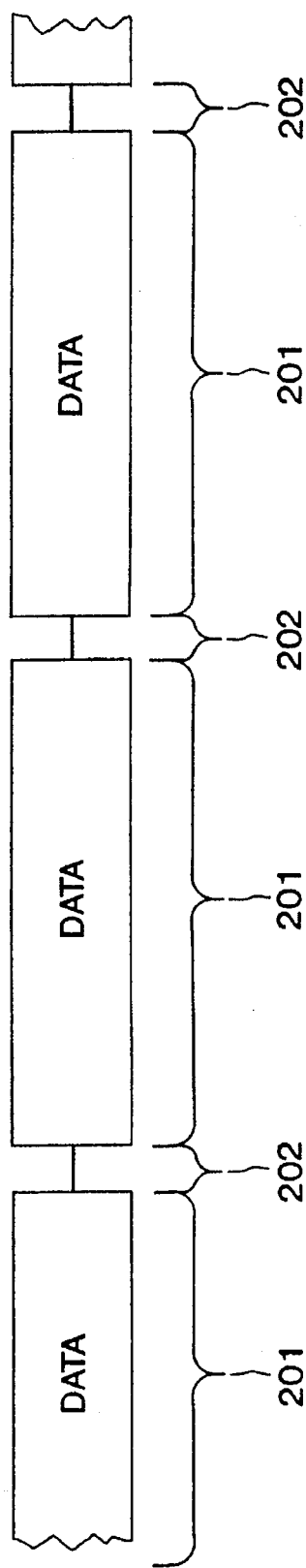
FIG. 3 shows a stream of digital data formed by a plurality of the segments shown in FIG. 2.

As shown in FIG. 3 a number of time slots including data portions 201 and offset compensation portions 202 are strung together to form a data stream. The data stream may be continuous, but more likely will comprise a predetermined number of slots that form a "frame" of the packetized digital transmission system. Offset compensation portions 202 appear periodically in the data stream at predictable, regular intervals in the preferred embodiment. This feature greatly reduces the complexity and time required to detect the offset calibration portion 202 and thus minimizes the data overhead required by offset calibration portion 202.

3. Operation of Discriminator 106

FIG. 4 shows an output signal 401 produced by discriminator 106 on line 106a (FIG. 1) at several times T1–T7 during operation. In viewing FIG. 4, it should be understood that the output of discriminator 106 lags behind the frequency change (i.e. from $f_1$ to $f_2$) due to filtering in discriminator 106 and receiver 104. As illustrated at 420, the voltage transition in the discriminator output 401 begins about one-quarter of a time period after the frequency change, and requires some time before discriminator output 401 changes sufficiently to cross line 402. Line 402 represents the offset voltage which is used to distinguish portions of the output of discriminator 106 that should be classified as a logic HIGH from those which should be classified as a logic LOW. For example, at times T1, T4, T6, and T7, a logic HIGH should be detected. Similarly, at times T2, T3, and T5, a logic LOW should be detected.

It can be seen that discriminator output 401, is not uniformly positioned about the offset voltage 402. Because receiver-demodulator circuit 107 heavily filters the output of discriminator 106, discriminator output 401 gradually rises and falls in response to changes in frequency from ode time period to the next. Hence, it usually takes more than one and occasionally three to four consecutive bits or time periods at a single frequency before discriminator output 401 will reach a peak or valley saturation point. A peak saturation voltage is indicated by dashed line 408 and a valley saturation voltage is indicated by valley 403.

The symbol $\Delta V$ is the voltage swing between the peak saturation voltage 408 and the valley saturation voltage 403. Assuming that the peak 408 and valley 403 voltages are ideally positioned and could be accurately measured, offset voltage 402 lies at one-half $\Delta V$ below the saturated peak voltage indicated by dashed line 408.

As illustrated by points 404 and 406 when there is only a single consecutive occurrence at a particular frequency, discriminator output 401 will not rise to the saturated value, but will instead rise to some level below that. The effect of this is that discriminator output 401 is asymmetrically positioned about offset voltage 402. In particular, peaks 404 is not at the same level as peak 407. This is one reason why offset compensation schemes that rely on detecting peak and valley voltages to determine the offset voltage cannot accurately find a true offset voltage unless the discriminator output 401 is produced during a time when the FSK signal is switching uniformly between $V_{HIGH}$ and $V_{LOW}$.

The lower curve in FIG. 4 illustrates the effect of distortion caused by circuit components in receiver-demodulator 107 on proper determination of an offset compensation bias voltage. The distortion is illustrated by clipping at valleys 413 and 416. Dashed lines at 403 and 406 indicate the unclipped wave form shown in the upper portion of FIG. 4. As can be seen, a calculated offset voltage 412 determined by a technique that measures the peak and valley voltages or averages the peak and valley voltages over time would be higher than the actual offset voltage 402. Since the function of calculated offset voltage 412 is to discriminate between logic HIGH signals and logic LOW signals in the output in the discriminator output 401 the effect of this clipping is to make this circuit more susceptible to errors caused by noise superimposed on the discriminator output 401.

An example of this is shown at 414 where noise superimposed on the signal causes a distortion in discriminator output 401. Although peak 414 should be interpreted as a logic HIGH, because calculated offset compensation voltage 412 is not centered at the true offset voltage 402 it is likely that peak 414 would be interpreted as a logic LOW, causing an error. However, in accordance with the present invention true offset voltage 402 is determined, and even when noise signal 414 is superimposed on a discriminator output 401 a correct logic HIGH can be determined.

4. Control Circuit Detail

Referring again to FIG. 1, the system in accordance with the present invention includes a transmitter 100 that broadcasts an FSK data signal with a center frequency $f_0$ periodically embedded at predetermined times in the FSK data signal. When receiver demodulator 107 processes the center frequency the output of discriminator 106 goes to a voltage corresponding to offset voltage 402 (Shown in FIG. 4). During these predetermined times the output of comparator 108 will be either $V_{HIGH}$ or $V_{LOW}$ depending on whether the discriminator 106 output is greater than or less than the bias voltage $V_b$ on line 114. Thus, control circuit 112 and bias circuit 113 must work together to (1) detect when the center frequency is being processed and (2) convert the binary logic level signal on line 109 from comparator 108 into an analog bias voltage $V_b$ on line 114.

Figure 5:
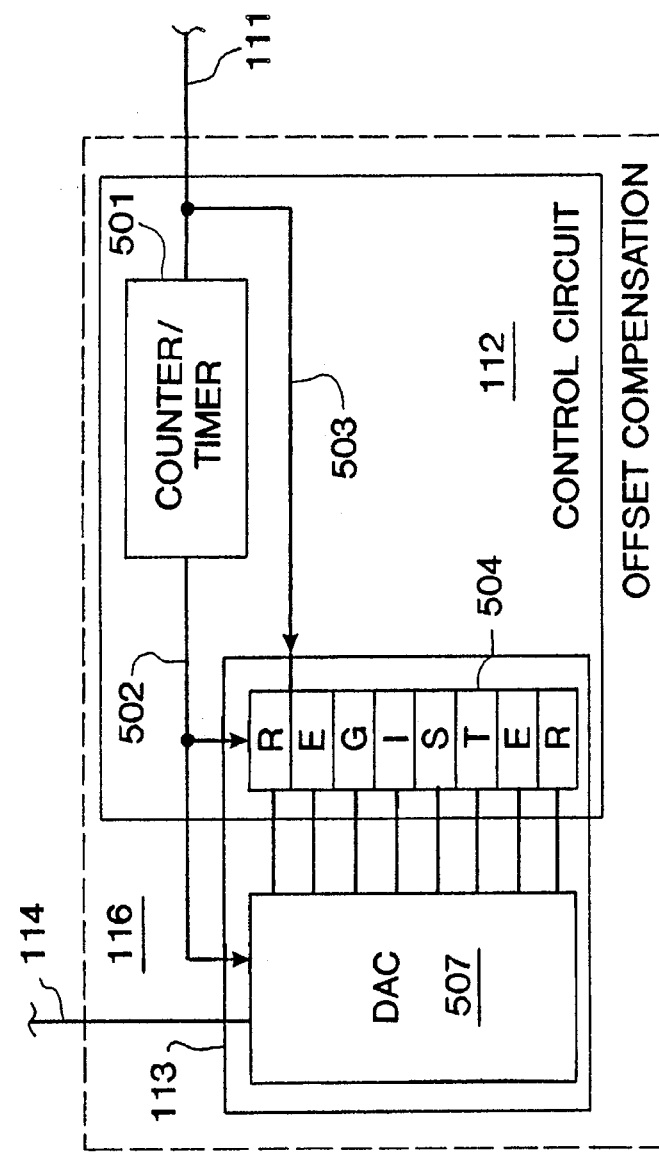
FIG. 5 illustrates in block diagram form details of offset compensation circuitry of the system shown in FIG. 1.

FIG. 5 illustrates details of control circuit 112 and bias circuit 113. Control circuit 112 includes a counter or timer 501 and optionally includes register 504. Counter/timer 501 counts pulses output by comparator 108 (FIG. 1) during the bit synchronization and word synchronization portions of the FSK signal (see FIG. 2). Because the center frequency $f_0$ is broadcast periodically it is known that offset compensation period 202 (shown in FIG. 2 and FIG. 3) will occur at a definite time after bit synchronization and word synchronization are achieved. Thus, counter/timer 501 simply waits for an elapsed time period until data time period 201 is complete. Once period 201 is complete, it is known that offset compensation time period 202 has begun, and counter timer 501 provides an enable signal on line 502.

Bias circuit 113 (FIG. 1) preferably comprises a digital-to-analog convertor (DAC) 507 in FIG. 5. Enable signal 502 is coupled to both DAC 507 and register 504. Register 504 may be alternatively be integrated into DAC 507, or provided in the same circuit as counter timer 501 as suggested above. Register 504 contains a number of storage cells, each storage cell containing one bit of a digital error word used to drive DAC 507. In a preferred embodiment, register 504 is an 8 bit register capable of being incremented or decremented by one least significant bit when enabled by a control signal on line 503. Hence, when the enable signal is provided on line 502 by counter/timer 501, register 504 will increase in value by one least significant bit if the input from line 503 is a logic HIGH. Similarly register 504 will decrease in value by one least significant bit if the value on line 503 is a logic LOW.

DAC 507 is preferably an 8 bit digital-to-analog convertor which stores the value from register 504 and provides an analog output corresponding to the digital error word provided by register 504. DAC 507 stores the value in register 504 and updates the analog output on line 114 when the enable signal is provided by counter timer 501 on line 502. When the enable signal is removed from line 502, DAC 507 maintains a constant analog output on line 114. It should be understood that digital-to-analog convertors with greater or lessor number of bits may be used. Similarly, counter/timer 501 may be replaced by more complicated circuitry for detecting when the offset compensation time period 202 (shown in FIG. 2 and FIG. 3) has occurred.

Preferably, control circuit 112, including counter timer 501 and optionally including register 504, is implemented in or is part of an on-board microprocessor in the receiving equipment 102. In many cases a microprocessor already exists in receiving equipment 102 (FIG. 1), and control circuit 112 in accordance with the present invention can be implemented by software changes in the existing microprocessor. A microprocessor or its equivalent is likely to exist in most digital receivers because it is necessary to determine the length of the data portion 201 (FIG. 2) even when prior offset compensation methods are used. Alternatively, register 504 is provided as a part of bias circuit 113 which can be easily implemented on a single circuit with DAC 507. Because register 504 can be implemented either as a part of control circuit 112 or bias circuit 113, it is included in both of the overlapping boxes that define control circuit 112 and bias circuit 113 in FIG. 5.

Thus, the offset compensation circuit 116 in accordance with the present invention is preferably implemented by adding functionality to already existing circuit hardware and involves little additional circuitry. In contrast, many prior offset compensation systems, particularly those requiring sampling and averaging of the peak and valley voltages of the discriminator output, require extensive dedicated circuitry. This feature of the present invention greatly simplifies implementation and manufacturing.

5. Operation and Timing

Figure 6:
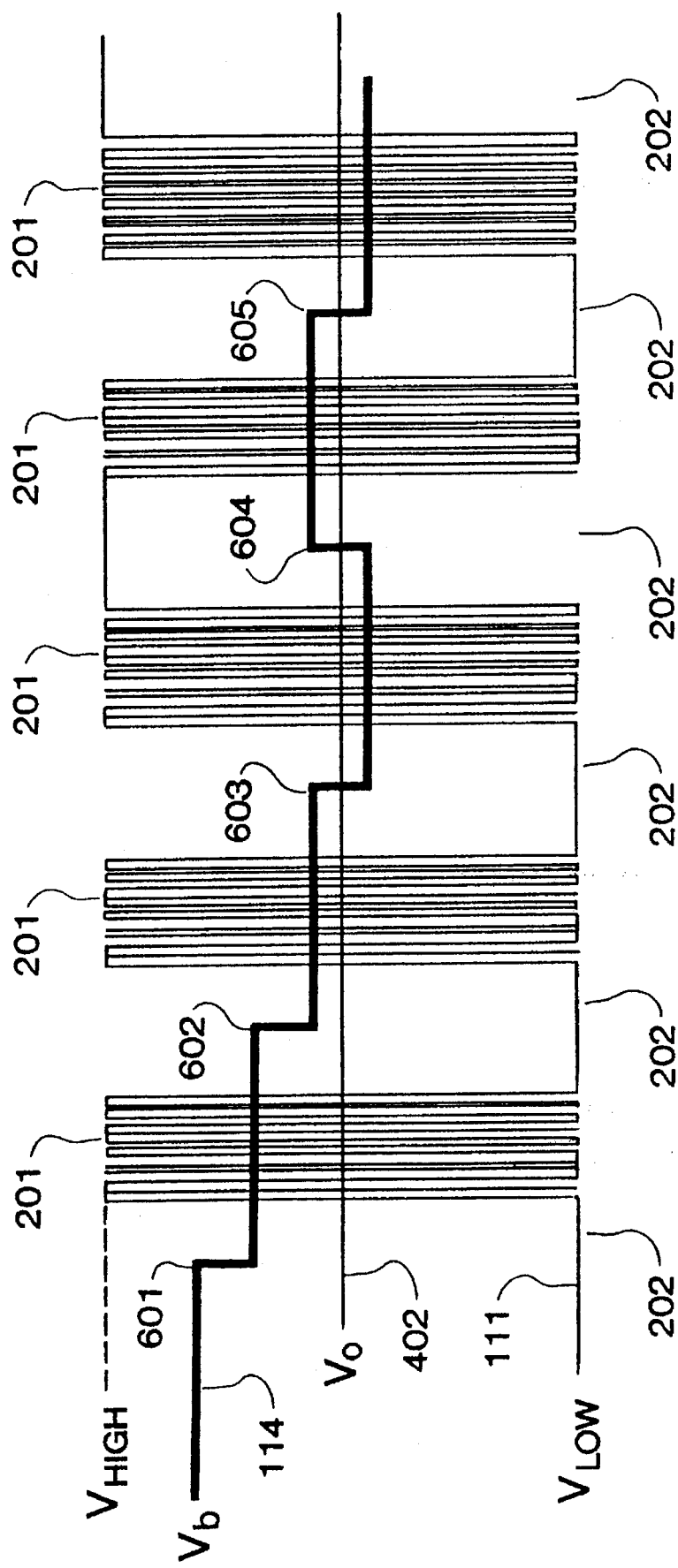
FIG. 6 is a timing diagram illustrating functioning of the system in accordance with the present invention.

FIG. 6 shows a highly simplified timing diagram illustrating how a bias voltage on line 114 is adjusted in response to the binary logic level output of comparator 108 on line 111. It can be seen that bias voltage 114 changes only during offset compensation period 202. As seen in FIG. 6, the bias voltage on line 114 changes by a uniform step function amount during each time period 202 when an error is detected. It must be understood that the magnitude of the changes in $V_b$ on line 114 in FIG. 6 are greatly exaggerated for purposes of illustration. In a practical implementation, the incremental changes in $V_b$ are a small fraction of the total voltage swing between $V_{HIGH}$ and $V_{LOW}$. For example, one least significant bit change in an eight bit DAC 507 produces an minimum increment of 1/256 or less than 0.4% of its full scale voltage swing. Preferably the full scale voltage swing of DAC 507 is about one volt so that each increment in $V_b$ on line 114 in FIG. 6 is less than 4 millivolts or about 0.08% of the five volt swing between $V_{HIGH}$ and $V_{LOW}$.

Before time 601 it can be seen that bias level on line 114 is higher than offset voltage 402. During time periods 202 discriminator 106 (FIG. 1) outputs a voltage substantially equal to offset voltage 402. Thus, at time 601 a comparator output on line 111 is a logic LOW indicating that the bias voltage on line 114 is higher than the discriminator output. Hence, when counter/timer 501 (FIG. 5) issues the enable signal on line 502, register 504 and DAC 507 are decreased in value by one least significant bit. As shown in FIG. 6 the analog output on line 114 drops by one least significant bit. Similarly, at times 602 and 603 the comparator output on line 111 is a logic LOW, so the analog voltage on line 114 is decremented by one least significant bit each time. In this manner, the offset compensation circuit 116 successively approximates offset voltage 402.

After time 603, it can be seen that the analog voltage on line 114 is less than one least significant bit away from offset voltage 402. During the subsequent offset compensation period 202, this may create either a logic HIGH or a logic LOW on line 111. As indicated at time 604, when a logic HIGH is present on line 111, the DAC 507 is incremented by one least significant bit. So long as the offset voltage 402 does not change, the offset compensation circuit 116 will toggle back and forth within one least significant bit of the true offset voltage 402.

In summary, the method in accordance with the present invention involves transmitting an FSK signal to receiving equipment 102 (FIG. 1). The FSK signal comprises data during a first portion 201 (FIG. 2) and includes a center frequency ($f_0$) during a second portion (202). The FSK signal is received and demodulated in receiving equipment 102 and each time the second portion 202 of the FSK signal is processed an old bias voltage generated by bias circuit 113 is compared the demodulated second portion of the FSK signal. An error signal is generated on the output of comparator 108 (FIG. 1) from the comparison. The error signal is then converted to a new bias voltage in bias circuit 113. The new bias voltage is then used for subsequent processing of the next data portion 201 of the FSK signal.

It is to be expressly understood that the claimed invention is not to be limited to the description of the preferred embodiment but encompasses other modifications and alterations within the scope and spirit of the inventive concept. For example, transmitter 100 may broadcast the center frequency more or less often than described in the preferred embodiment. Also, the center frequency may be broadcast periodically or randomly in any manner that receiving equipment 102 can detect. Although the preferred embodiment increments DAC 507 by a single least significant bit each time the offset compensation period occurs, many variations are possible. For example, if the signal on line 111 is a consistent logic level for several consecutive offset compensation periods 202, this indicates a large difference between the true logic center voltage 402 and the bias voltage on line 114. In this case, DAC 507 (FIG. 5) can be incremented by a larger amount to achieve more rapid correction. This method would require additional logic circuitry (not shown) in control circuit 112 (FIG. 1) but is within the skill of the ordinary digital designer.

While the above sets forth a preferred system and method for compensating or offset voltage in a digital data receiver, it is to be expressly understood that the transmitter 100 and receiving equipment 102 may be configured as transceivers to receive and compensate for offset voltage of data transmitted from either transceiver to the other according to the teachings hereunder. It is to be expressly understood that the claimed invention is not to be limited to the description of the preferred embodiment but encompasses other modifications and alterations within the scope and spirit of the inventive concept.

I claim:

1. A system for automatically compensating for offset in a Frequency Shift keying (FSK) receiver, the receiver having an output providing a demodulated analog signal having the offset voltage superimposed thereon, the system comprising:

transmitter means for broadcasting a FSK signal, said FSK signal including a central frequency f0 during a predetermined portion;

a comparator having a first imput DC coupled to the receiver output, the comparator also having an output for providing a logic level binary signal corresponding to the demodulated analog signal, and a second input for receiving an analog bias votage;

control means including a counter/timer responsive to the comparator output for identifying the predetermined portion of the FSK signal and generating an enable output signal during the predetermined portion, the control means for generating an error signal on control output, the error signal based on the value of the comparator output during the predetermined portion of the FSK signal; and bias means responsive to the error signal and having an output coupled to the second input of the comparator or providing the analog bias voltage, the bias means capable of increasing and decreasing the analog bias voltage in response to the error signal from the control means.

2. The system for automatically compensating for DC offset of claim 1 wherein the bias means comprises:

a digital to analog converter (DAC) responsive to the enable signal;

a register responsive to the enable signal and to the comparator output so as to increment the register value when the comparator output is a logic "HIGH" and decrement the register value when comparator output is a logic "LOW", wherein the register value is coupled to drive the DAC so that the analog bias voltage on the DAC output is determined from the register value; and an enable input coupled to the enable output signal of the control means, wherein the DAC stores the current signal on the control output of the control means in the register only when the enable input is received.

3. The system for automatically compensating for DC offset of claim 2 wherein the DAC is an eight bit DAC.

4. A system for automatically compensating for DC offset of a demodulated analog Frequency Shift Keying (FSK) signal in a receiver, the system comprising:

a transmitter for broadcasting the FSK signal at radio frequency, the FSK signal including a central frequency ($f_0$) during a predetermined portion;

a receiver having an input for receiving the radio frequency FSK signal and an output for providing an intermediate frequency (IF) signal;

a discriminator having an input coupled to the output of the receiver and an output for providing a demodulated analog signal, wherein the demodulated analog signal includes a DC offset;

a comparator having a first input coupled to the discriminator output, the comparator also having an output for providing a logic level binary signal corresponding to the demodulated analog signal, and a second input for receiving an analog bias voltage;

means coupled to the comparator output and having an enable output for detecting the predetermined portion of the FSK signal, wherein the means for detecting generates an enable signal on the enable output during the predetermined portion of the FSK signal;

means coupled to the comparator output and having a control output bus for converting the logic level binary signal to a digital error word during the predetermined portion of the FSK signal, wherein the means for converting provides the digital error word on the control output bus; and means coupled to the control output bus and the enable output and having an output coupled to the second input of the comparator for translating the digital error word into the analog bias voltage, wherein the means for translating increases and decreases the analog bias voltage in response to the digital error word and the enable signal.

5. The system for automatically compensating for DC offset of claim 4 wherein the means for translating is a digital to analog converter.

6. The system for automatically compensating for DC offset of claim 4 wherein the discriminator output is DC coupled to the first input of the comparator.

7. The system for automatically compensating for DC offset of claim 6 wherein the means for converting the logic level binary signal to the digital error word comprises:

a register coupled to the control output bus for storing the digital error word, wherein the register is responsive to the logic level binary signal for incrementing the digital error word by one least significant bit when the logic level binary signal is a logic "HIGH" during the predetermined portion of the FSK signal, and the register is responsive to the logic level binary signal for decreasing the digital error word by one least significant bit when the logic level binary signal is a logic "LOW" during the predetermined portion of the FSK signal.

8. The system for automatically compensating for DC offset of claim 7 wherein the means for converting changes the digital error word by only one least significant bit during every occurrence of 5 the predetermined portion of the FSK signal.

9. A method for automatically compensating for DC offset of a demodulated analog Frequency Shift Keying (FSK) signal in a receiver, the method comprising the steps of:

transmitting a FSK signal to the receiver, wherein the FSK signal comprises data during a first portion and includes a center frequency ($f_0$) during a second portion;

receiving the transmitted FSK signal;

demodulating the received FSK signal;

processing the second portion of the FSK signal by the steps of:

providing a first bias voltage;

comparing the demodulated second portion of the FSK signal to the first bias voltage and generating an error signal from the comparison, wherein the step of generating the error signal comprises generating a binary logic level error signal;

providing an old digital error word in a storage register;

updating the old digital error word by only one least significant bit based on the binary logic level error signal to provide a new digital error word; and converting the new digital error word into an analog voltage, wherein the analog voltage is a second bias voltage that replaces the first bias voltage for subsequent comparing steps.

\* \* \* \* \*

UNITED STATES PATENT AND TRADEMARK OFFICE
CERTIFICATE OF CORRECTION

PATENT NO. : 5,608,762
DATED : Mar. 4, 1997
INVENTOR(S) : Maddy

It is certified that error appears in the above-indentified patent and that said Letters Patent is hereby corrected as shown below:

On the title page:

Section [56], References Cited, replace "4,939,851" with "4,929,851"

Abstract, line 4, replace "provide and analog" with --provide an analog--
Abstract, line 11, replace "center of frequency" with --center frequency--
Column 6, line 16, replace "107" with --104--
Column 7, line 13, replace "ode" with --one--
Column 7, line 31, replace "peaks" with --peak--
Column 10, line 39, insert --DC-- before "offset"
Column 10, line 45, replace "f0" with --$f_0$--
Column 10, line 61, replace "or" with --for--
Column 12, line 25, delete "5"

Signed and Sealed this

Eleventh Day of November, 1997

Attest:

Attesting Officer

BRUCE LEHMAN

Commissioner of Patents and Trademarks